(12) United States Patent
Murphy et al.

(10) Patent No.: US 9,025,486 B1
(45) Date of Patent: May 5, 2015

(54) DETERMINING QUALITY OF RADIO ACCESS NETWORK TRANSMISSIONS

(71) Applicant: NetScout Systems, Inc., Westford, MA (US)

(72) Inventors: Jason Murphy, Olathe, KS (US); Gregory Mayo, Salem, NH (US)

(73) Assignee: NetScout Systems, Inc., Westford, MA (US)

( * ) Notice: Subject to any disclaimer, the term of this patent is extended or adjusted under 35 U.S.C. 154(b) by 105 days.

(21) Appl. No.: 14/048,346

(22) Filed: Oct. 8, 2013

(51) Int. Cl.
*H04W 24/00* (2009.01)
*H04W 80/04* (2009.01)

(52) U.S. Cl.
CPC .............. *H04W 24/00* (2013.01); *H04W 80/04* (2013.01)

(58) Field of Classification Search
None
See application file for complete search history.

(56) References Cited

U.S. PATENT DOCUMENTS

| 7,711,751 | B2 | 5/2010 | Kelley et al. | |
| 8,837,297 | B2* | 9/2014 | Larsson | 370/241 |
| 2010/0022251 | A1* | 1/2010 | Watanabe et al. | 455/450 |
| 2010/0061259 | A1* | 3/2010 | Larsson | 370/252 |
| 2013/0242761 | A1* | 9/2013 | Park | 370/252 |
| 2014/0101305 | A1 | 4/2014 | Kelley | |

* cited by examiner

*Primary Examiner* — Hong Cho
(74) *Attorney, Agent, or Firm* — Fenwick & West LLP (57) ABSTRACT

Methods are described that are used to identify quality problems in a wireless communication network as experienced by a user-session of a mobile computing device, and quantify the quality of network transmission associated with the user-session. The quality of transmission during a user-session can then be used to characterize the network quality as experienced by an end user. One benefit of applying the described methods is that the actual quality of network transmissions experienced in a user-session is quantified rather than being inferred from the performance of a radio access network ("RAN") transceiver. The described methods are used in some examples to determine network quality issues related to user-session characteristics, such as location and mobile computing device type.

20 Claims, 6 Drawing Sheets

| CQI | MCS | I_TBS | rb | TBS | SiSO | MIMO | Modulation | Bit/Symbol |
|---|---|---|---|---|---|---|---|---|
| 15 | 28 | 26 | 25 | 18336 | 18.3Mbps | 36.7Mbps | 64QAM | 6 |
| 14 | 28 | 26 | 25 | 18336 | 18.3Mbps | 36.7Mbps | 64QAM | 6 |
| 13 | 27 | 25 | 25 | 15840 | 15.8Mbps | 31.6Mbps | 64QAM | 6 |
| 12 | 25 | 23 | 25 | 14112 | 14.1Mbps | 28.2Mbps | 64QAM | 6 |
| 11 | 23 | 21 | 25 | 12576 | 12.6Mbps | 25.2Mbps | 64QAM | 6 |
| 10 | 20 | 18 | 25 | 9912 | 9.9Mbps | 19.8Mbps | 64QAM | 6 |
| 9 | 16 | 15 | 25 | 7736 | 7.7Mbps | 15.4Mbps | 16QAM | 4 |
| 8 | 14 | 13 | 25 | 6456 | 6.5Mbps | 13 Mbps | 16QAM | 4 |
| 7 | 12 | 11 | 25 | 4968 | 4.9Mbps | 9.8Mbps | 16QAM | 4 |
| 6 | 9 | 9 | 25 | 4008 | 4.0Mbps | 8 Mbps | QPSK | 2 |
| 5 | 7 | 7 | 25 | 3112 | 3.1Mbps | 6.2Mbps | QPSK | 2 |
| 4 | 5 | 5 | 25 | 2216 | 2.2Mbps | 4.4Mbps | QPSK | 2 |
| 3 | 2 | 2 | 25 | 1096 | 1.1Mbps | 2.2Mbps | QPSK | 2 |
| 2 | 0 | 0 | 25 | 680 | .7Mbps | 1.4Mbps | QPSK | 2 |
| 1 | 0 | 0 | 25 | 680 | .7Mbps | 1.4Mbps | QPSK | 2 |
| 0 | Not Connected | | | | | | | |

DETERMINING QUALITY OF RADIO ACCESS NETWORK TRANSMISSIONS

BACKGROUND

The present disclosure relates generally to measuring the performance of radio access networks. Specifically, the present disclosure is directed to determining quality of radio access network transmissions.

Wireless networks and the use of mobile computing devices in communication with wireless networks are ubiquitous. Advances in mobile computing have led to ever faster and more sophisticated mobile computing devices. However, in many cases, the performance of wireless communication networks, and in particular cell phone networks, limits the ability of a user to access the Internet, make phone calls, or otherwise use a mobile computing device to its fullest capability.

Because of the occasional deficiencies of wireless communications networks (particularly cell phone networks), a wireless service provider will analyze the performance of its network to identify locations and root causes of network deficiencies. Correcting the causes of these deficiencies improves the performance of the networks, increasing user satisfaction and improving the competitive position of the service provider in the marketplace.

However when analyzing performance deficiencies, wireless service providers generally focus on coarse measures of network performance that are conveniently measured by accessing data describing the performance of a particular radio network transceiver ("e-node B"). These measures can include bandwidth entering and exiting a particular cell phone tower, or the number of available frequencies transmitted to and from a particular tower. These coarse measures are used to determine a channel quality index ("CQI") that is based primarily on a comparison of an actual data throughput of a radio access network transceiver compared to a theoretical maximum value of data throughput of the RAN transceiver. This is a coarse performance gauge and does not, however, specifically identify the quality of use that is experienced by specific users of mobile computing devices.

In some cases, typically in response to a customer complaint, a wireless service provider will identify a more precise measure of CQI by sending a query to the mobile computing device associated with the complaining user. The query accesses data stored by the computing device that is more descriptive of the quality of wireless service experienced at the user device than the coarse measures of CQI that are more commonly used to monitor network performance.

However, accessing device-specific data in this way is inconvenient for both the user and the wireless service provider. Furthermore, this more precise method of determining a CQI is limited to only the device receiving a query from the wireless service provider. As such, this CQI method is inadequate for identifying transmission issues having systemic causes, such as device geographic location, device type, device characteristic, or other similar factors.

SUMMARY

Embodiments of the present disclosure include methods and systems used to identify quality problems in a wireless communication network experienced by a user-session of a mobile computing device, and quantify the quality of network transmission associated with the user-session, using network transmission information specific to the user-session and measured in real time. The network transmission information of the user-session is measured at points within at least one of a radio access network or a core network without resorting to querying the user device, unlike CQI measurements. The quality of transmission during a user-session can then be used to characterize the network quality as experienced by an end user. This is in contrast to conventional methods of quality measurement that focus on transmission rates, reception rates, and available bandwidth of wireless signals at a wireless transceiver (e.g., a cell phone tower), thus identifying the best case of network quality. This method is also in contrast to more precise measures of CQI that require querying a mobile computing device for historical performance data recorded at the device.

One benefit of applying embodiments of the present disclosure in measuring the quality of a user-session (also characterized in the industry as "end-user experience") is that it is specific to a user-session, (e.g., open on a mobile computing device) and conveniently measured in real-time in the network rather than requiring the access of historical data from a user's computing device. That is, using embodiments of the present disclosure, the actual quality of network transmissions experienced in a user-session is quantified using data measured in the network rather than being inferred (generically and not specific to a user-session) from the performance of a radio access network ("RAN") transceiver or identified by accessing data at the user's device upon a user complaint.

Another benefit of applying embodiments of the present disclosure is that user-session quality can be measured in real-time and as a function of broad network conditions, such as computing device type, geographic location, and others. This enables the wireless service provider to identify system-scale quality issues that have causes or factors that are common to multiple users, but would not otherwise be detectable by querying a mobile computing device of a single user or measuring transmission performance from a particular network transceiver.

Examples of quality metrics measured by embodiments of the present disclosure for a user-session include transmission latency of a mobile computing device, dropped call frequency, data throughput from the mobile computing device to a server, and the like.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Communications Network

Figure 1A:
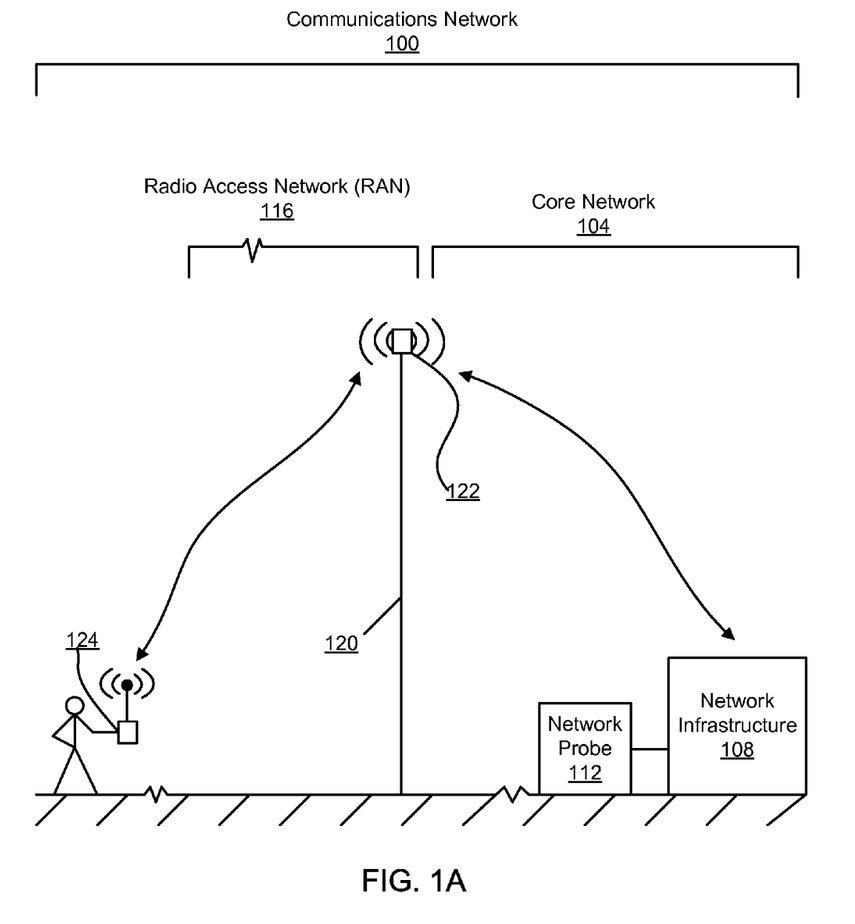
FIG. 1A is an illustration of a communications network that includes a core network and a radio access network, in an embodiment.

FIG. 1 illustrates a communications network 100 and some of components of the communications network used to connect a mobile computing device to various networks (e.g., the Internet, a phone system). In the example shown, the communications network 100 includes a core network 104 and a radio access network (RAN) 116.

The core network 104 of the communications network 100 provides communications paths for the transmission of data through various sub-networks (e.g., telephone networks, the Internet) and between users of various types (e.g., content providers, individual users, service providers). The core network 104 includes elements of network infrastructure 108 and a network probe 112.

The network infrastructure 108 of the core network 104 includes data transmission paths (whether optical, radio, or others), switching and routing equipment, failover and authentication servers, and other elements not shown or described that are used for the operation of one or more public or private communications networks. These details are omitted in the depiction of the communications network 100 to preserve clarity of the description.

In communication with the network infrastructure 108 is at least one network probe 112, which is used to identify and monitor transmissions specific to one or more user-sessions. The network probe 112 analyzes packets transmitted as part of a user-session to determine data throughput, latency, user-session identity, mobile computing device identity (using e.g., IMSI or MAC) and other characteristics of a user-session specific to a mobile computing device. The network probe accomplishes this by tapping transmission links of the communications network 100 and analyzing packets transmitted as part of a user-session in real-time. Operation and application of a network probe is described in U.S. Pat. No. 7,711,751 and U.S. patent application Ser. No. 13/647,503, which are incorporated by reference herein in their entireties. One example of a network probe 112 is INFINITREAM® produced by NETSCOUT SYSTEMS® of Westford, Massachusetts. While shown in communication with the network infrastructure 108, the network probe can tap other elements of the core network 104 or the radio access network 116 to measure transmission quality of a user-session.

The core network 104 is in communication with the RAN 116 to provide communications services (e.g., voice telephony, Internet access) to mobile computing devices or stationary computing devices that have RAN communications abilities. In the example shown, the RAN 116 includes at least one radio tower 120, and at least one transceiver 122 (i.e., "e-node B"). These elements are in communication with a mobile computing device 124. the RAN 116.

Figure 1B:
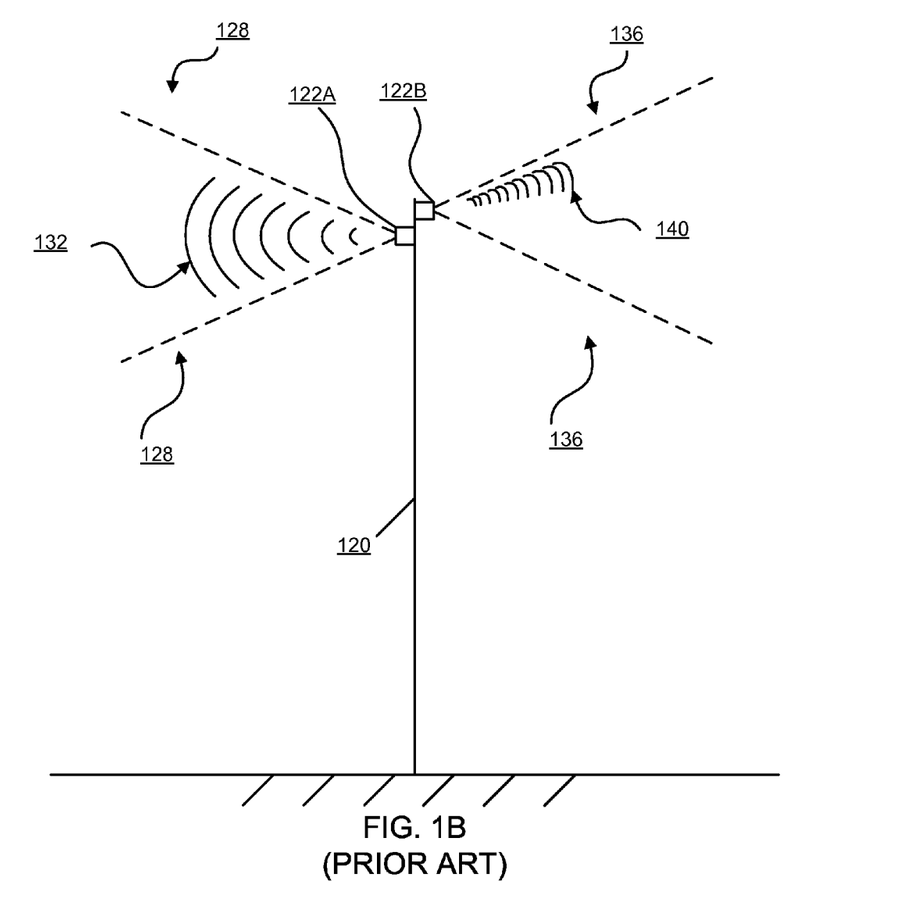
FIG. 1B is an illustration of different proportions of bandwidth usage by transceivers of a radio access network used to determine a channel quality index, in an embodiment.

The radio tower 120, also shown in FIG. 1B, is a support structure for supporting one or more radio transceivers 122 that are used for receiving and transmitting radio communications. While the tower 120 of FIG. 1A is shown as a monopole supporting the one or more transceivers 122 above ground level, other embodiments of the tower can be used. For example, the transceivers can be disposed on or within buildings, power line supports, shorter support structures, or any other structure convenient for placing the transceivers 122 in a location favorable for the transmission and reception of communications signals.

The one or more radio transceivers 122 are used for transmitting radio-frequency communications signals using any of a variety of protocols. A transceiver 122 receives signals (which can be packets) from the core network 104, converts the data of the signal for transmission via radio frequency, and then transmits the data using an antenna (not shown) to, for example, a mobile computing device 124. Examples of communications protocols used by the transceiver 122 include, but are not limited to, CDMA, 3G, 4G LTE, and others.

As mentioned above, the RAN 116 is in communication with a mobile computing device 124 through the transceiver 122. The mobile computing device 124 includes a processor, software, a display, and other elements that include, but are not limited to, the elements of a computing device 400 shown in FIG. 4.

FIG. 1B depicts two operational conditions of the transceivers 122A and 122B, each having a different proportion of bandwidth consumed by data transmissions which can influence the conventionally measured CQI. This in turn can influence the performance of the RAN 116 and the quality of communication experienced at a user-session of the mobile computing device 124. The more bandwidth consumed at any given time, the more likely that a user will experience a performance problem (e.g., latency or dropped signal). In large part, it is this application that wireless service providers use to monitor the performance their networks and identify network performance problems that have a cause associated with the transceiver 122.

In one operational condition, the transceiver 122A transmits a quantity of communications signals 132 at an upper limit of a bandwidth illustrated by the dashed lines 128. Similarly, the transceiver 122B can transmit a quantity of communications signals 140 at an upper limit of a bandwidth illustrated by the dashed lines 136.

The different operational conditions of transceivers 122A and 122B are illustrated by the portions of available bandwidth 128 and 136 actually in use by each transceiver. For example, transceiver 122A transmits communications signals 132 using most of the communications bandwidth 128 associated with the transceiver. In contrast, transceiver 122B transmits communications signals 140 using only a fraction of the communications bandwidth 136 associated with the transceiver. The difference in the portion of the bandwidth used can affect the quality of transmission to and from a user-session, as indicated by such parameters as latency, dropped signals, and other similar performance metrics. As explained above, this measurement of the portion of bandwidth used for transmission is often used by service providers to calculate CQI as an indicator of the performance of the communications network. However, CQI does not include more precise analysis of user-session based performance, or factors (such as mobile computing device 124 model or technology) that can influence user experience.

Radio Access Network (RAN) Quality Index

Determination of a radio access network quality index ("RQI") as a quantitative measurement of the transmission quality of a user-session includes two elements. The first element (described below in the context of FIG. 2A) is a determination of a theoretical data throughput of a RAN transceiver that is an approximate upper limit of data transmittable by a RAN transceiver per unit time. The second element (described below in the context of FIG. 2B) is a determination of the actual data throughput for a user-session as measured at one or both of the RAN 116 or core 104 networks, which is then compared to the theoretical data throughput of the RAN transceiver. This second element connects the actual data throughput associated with a user-session to the capability of a particular transceiver 122, thereby providing a more precise and accurate user-session quality indicator. Because RQI is specific, in some applications, to a user-session, the RQI can provide more information usable to resolve user-specific network performance issues (e.g., related to device 124 type). As mentioned above, the benefits of RQI include measuring the user-session performance in real-time, measuring RQI at one or both of the RAN 116 or core 104 networks, and using the network measurements to identify systemic performance issues not identifiable through the methods of determining CQI.

Figure 2A:
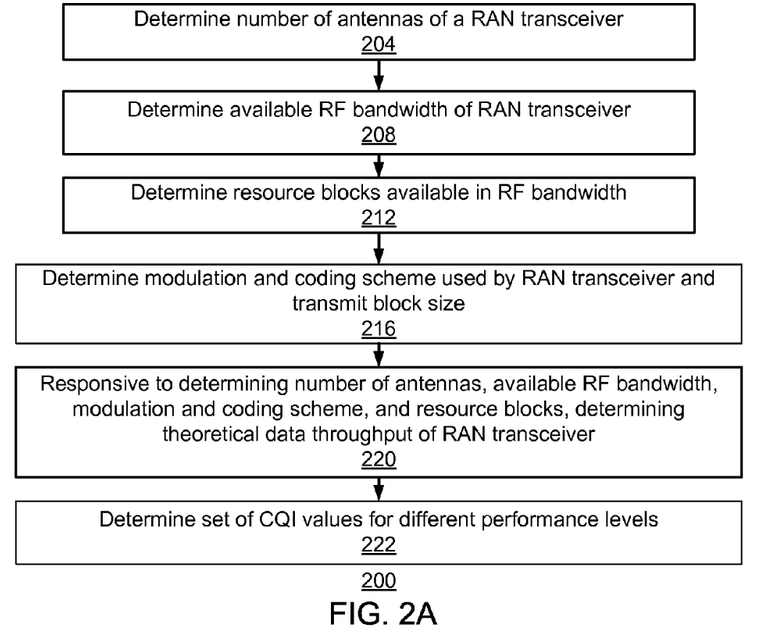
FIG. 2A is a method flow diagram illustrating a method for determining a theoretical data throughput of a radio access network transceiver, in an embodiment.

FIG. 2A is a block diagram of a method 200 for the first element of determining RQI for a user-session. That is, the method 200 is used to determine a theoretical data throughput of a RAN transceiver 122. In the example method 200, the number of antennas of a RAN transceiver 122 is determined 204. Each antenna has an upper limit to an amount of data transmittable per unit time for a given hardware configuration, technology, and communications protocol. By adding antennas to a transceiver the data transmission capacity can be increased. Configurations of antennas on transceivers 122 include "single input/single output" (SISO) (i.e., one antenna associated with the transceiver) and "multiple input/multiple output" (MIMO) (i.e., more than antenna associated with the transceiver) systems.

The RF bandwidth of the RAN transceiver 122 is determined 208. As described above in the context of FIG. 1B, the bandwidth affects the data throughput per unit time and can impact the quality of the "user experience" during operational conditions in which most of the available bandwidth is consumed. In some examples of RAN 116, the bandwidth is 5 MHz, although other bandwidths can be used.

Continuing with FIG. 2A, the available resource blocks within the bandwidth are determined 212. A resource block is a sub-portion of the available bandwidth in which communications transmissions are sent. For example, a bandwidth of 5 MHz can be partitioned into 1 MHz resource blocks. Each resource block is then allocated a portion of a transmission as a way to increase the speed and density of communications transmissions. For example, the "LTE" protocol limits a 5 MHz bandwidth limits to 25 resource blocks an intervals of 180 kHz. This then occupies 4.5 MHz of the available 5 MHz of bandwidth.

The modulation and coding scheme ("MCS") used by the RAN transceiver is also determined 216. The MCS is identified for each defined grade of CQI and used to determine the index transport block size ("iTBS") values by reference to "Tspec" TS36.213, section 7.1.7, table 7.1.7.1-1 or according to the calculation described in section 7.1.7.2. The MCS is a protocol used to alter an incoming data signal from the core network 104 and transform it into an RF signal that is encoded with data that is then transmitted by a transceiver 122. In some examples, the MCS is used to modulate a first RF frequency to a second RF frequency or is used to encode data into different formats to facilitate transmission, reception, or both of the data. For example, this can be accomplished by varying parameters of the various signals, and their components. One specific example of a modulation and coding scheme is quadrature amplitude modulation ("QAM"). This scheme can transmit, for example, two digital bit streams by modulating the amplitudes of the two transmitted signals and shifting the signals so that they are out of phase from each other. This is just one example of such a scheme. Other modulation and coding schemes include 64QAM, 16QAM, QPSK, and BPSK.

The transmitted block size ("TBS"), the amount of data that can be sent or received in one millisecond, is also determined 216 as part of the method 200 to determine the theoretical throughput. The TBS is determined with reference to TS36.213 table 7.1.7.2.1 (described above).

Using the factors determined 204-216 as described above, the theoretical data throughput is then determined 220. This theoretical data throughput is determined 220 by multiplying the TBS value by the number of antennas on the transceiver by 1000 ms and dividing the product by one million to determine the theoretical throughput in megabytes per second. The determined 220 upper theoretical throughput corresponds to a CQI of 15 and can be used to determine 222 a set of CQI values corresponding to different performance levels, as shown in FIG. 2C and determined by comparing the theoretical data throughput of a transceiver 122 to an actual throughput. In FIG. 2C various levels of performance are associated with decreasing CQI values. For example, if the theoretical throughput of a SISO transceiver is 18.3 Mbps for a CQI of 15, but operational problems at the transceiver cause the actual maximum transmission to be only 7.7 Mbps, then users communicating with the transceiver will experience a CQI of 7. CQI is used as a component of the determination of RQI, as described below.

Figure 2B:
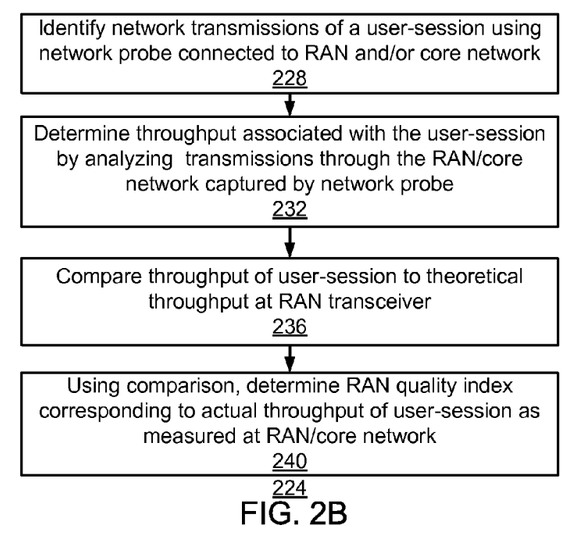
FIG. 2B is a method flow diagram illustrating a method for determining a radio access network quality index, in an embodiment.
Figure 2C:
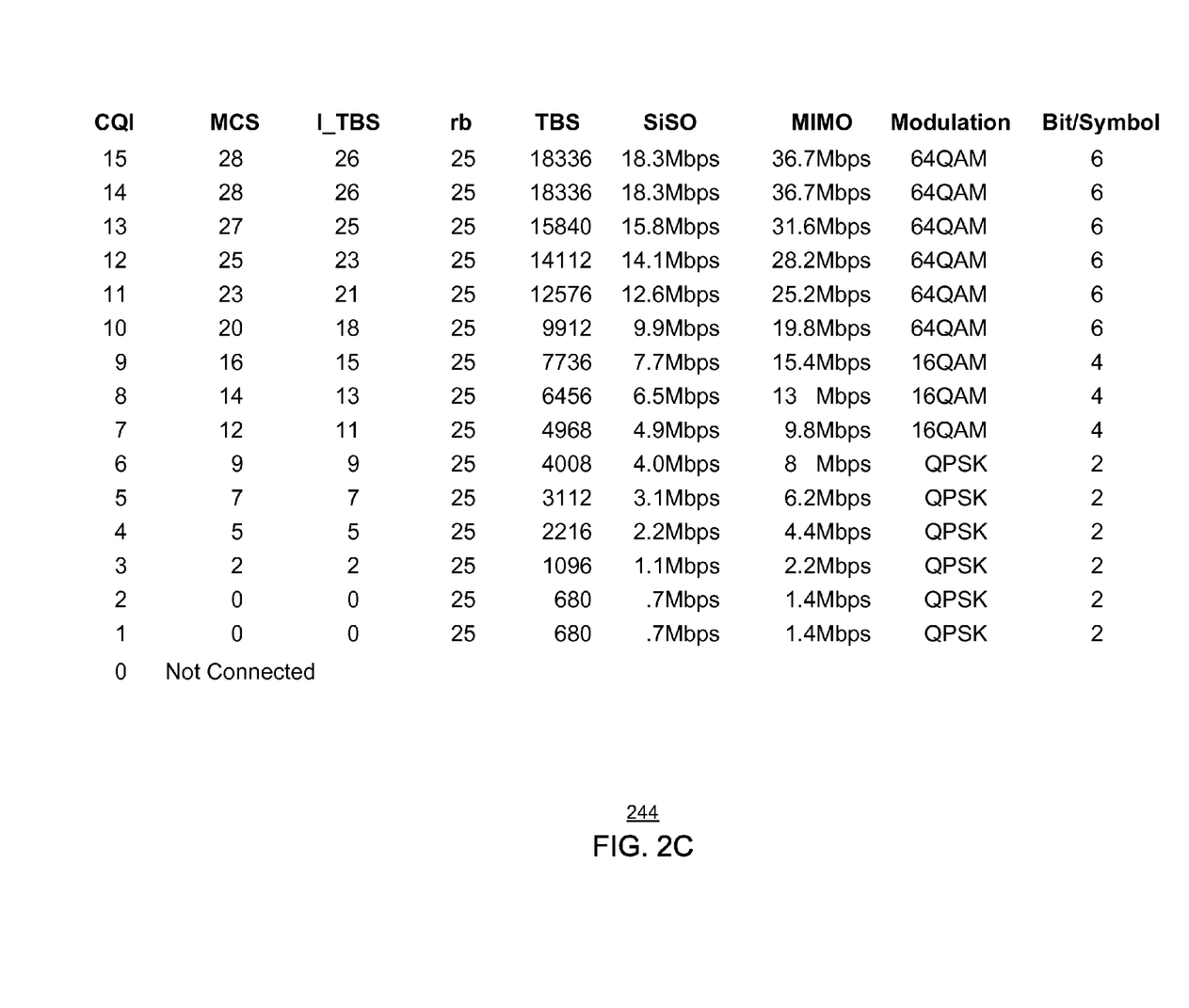
FIG. 2C is a table showing variables and metrics characterizing a radio access network transceiver that are used for determining a radio access network quality index, in an embodiment.

FIG. 2B illustrates an example method 224 for determining RQI for a user-session. Transmissions through the RAN 116 of the communications network 100 are identified 228 as corresponding to a user-session using the network probe 112, described above in the context of FIG. 1A. Using the network probe 112, the data throughput associated with the user-session is determined 232 by analyzing, in real time, the packet transmissions intercepted at a point in the RAN network 116 or the core network 104. As mentioned above, using the network probe 112 permits user-session data to be acquired without querying the performance data stored by the user computing device 124. The actual throughput associated with the user-session is compared 236 to the theoretical throughput at an associated RAN transceiver, as determined 220 by method 200. Through this comparison, the RQI is determined 240 corresponding to the actual data throughput of the user-session, as described by method 224.

This particular embodiment of the method 224 is applied during field integration or validation testing, analyzing complaints from users, monitoring the performance of user-sessions corresponding to high priority users, RAN validation for specific users, as well as other applications.

For illustration purposes only, table 244 of FIG. 2C depicts the CQI values corresponding to various performance levels for a 5 MHz transceiver. The application of methods 200 and 224 and the determination of an RQI corresponding to an actual user-session data throughput as measured at a point on one or both of the RAN 116 or core network 104 is further illustrated by reference to FIG. 2C.

As mentioned above, CQIs are defined as part of an industry standard for various performance levels as quantified by reference to, for example, transmitted block size, the SISO and MIMO data transmission rates (e.g., for transceivers 122 with one or two antennas, respectively) as indicated by various column headings in table 244.

RQI identifies the actual transmission throughput experienced by a user-session using data measured from one or both of the RAN 116 or the core network 104 and determines a value using, for example, the industry standard values calculated for CQI. That is, industry standard values determined for CQI and shown in FIG. 2C can be used to determine RQI, but the RQI value is selected based on actual user-session data measured from one or both of the RAN 116 or core 104 networks, and not coarse transceiver data or historical data retrieved from a mobile computing device 124.

With continuing reference to FIG. 2C, the differences between CQI and RQI are illustrated by the following example. For the conventionally measured CQI, upon a user reporting poor service, a wireless network service provider will check the performance of the transceiver broadcasting to a geographic location corresponding to the user. If the SISO transceiver is rated for 36.7 Mbps and is known to be actually transmitting at approximately that level (corresponding to a CQI of 15) then either the user is told that there is no problem with the network or the service provider queries the user's computing device to determine the actual throughput experienced by the device. If the query returns data indicating an actual throughput of 4.9 Mbps, or a transmitted block size of 4968 or a QPSK modulation, then the wireless service provider will identify a CQI of 7 for that user.

However, using the methods and systems of the present disclosure, the network monitor continuously monitors the performance of user-sessions throughout the RAN 116 and core 104 networks, and does not require a customer complaint to identify deficiencies. For example, a user-session can be detected as having a QPSK modulation, a TBS less than 9912, or a data throughput of 8 Mbps in real-time. Any of these values would indicate that the user-session is experiencing an RQI of 6. Given this detection, elements of the network can be checked for their performance without contacting the user associated with the user-session.

These methods and systems can also be used to identify systemic problems with communication network 100 performance. For example, upon determining that several thousand user-sessions have an RQI of 6, the system can determine by reference to data associated with user profiles or data associated with the mobile computing devices themselves that each of the users has a same type of mobile computing device 124 or a same version of software on the device and proactively work to correct the problem or notify the users. Similarly, these methods and systems can be used to identify problems associated with an apartment building, a street, a city, a state, a region, or a network as a whole, as describe below in more detail.

Determining RQI at Different Network Scales

Figure 3:
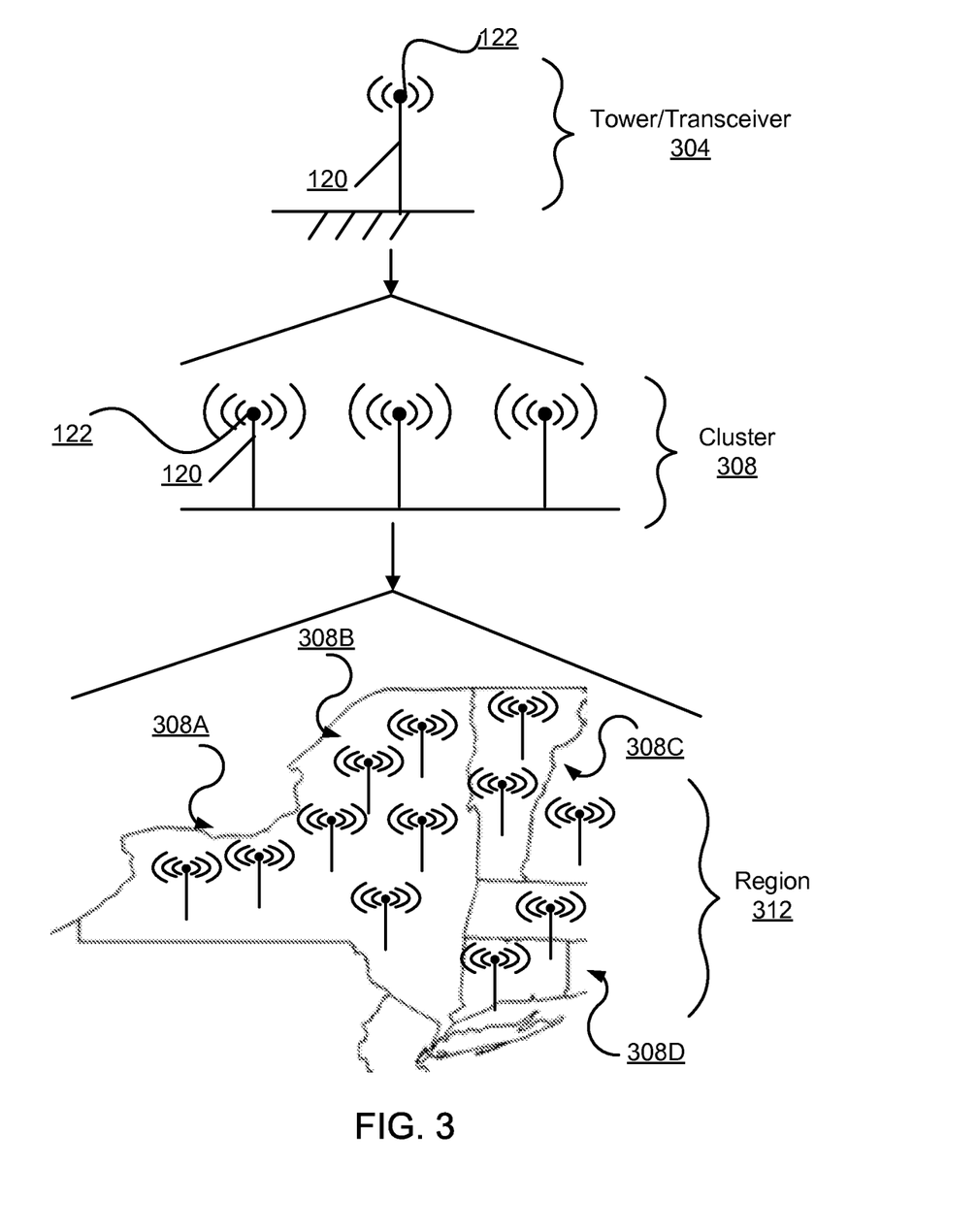
FIG. 3 is an illustration of some of the various scales of radio access network service areas for which a radio access network quality level can be determined, in an embodiment.

As shown in FIG. 3, embodiments of the present disclosure can be used to calculate RQI for various scales of the communications network 100. Whereas examples described above focus on the determination of RQI for an individual user-session, the example schematically illustrated at 304 shows determination of RQI for a plurality of user-sessions associated with a particular tower or transceiver (i.e., "e-node B") of the RAN 116. This is accomplished by determining the transmission frequency or frequencies, the corresponding bandwidths, the number of antennas of each transceiver 122, and a number of users per frequency per sector. In this example, a sector is an antenna on a tower 120 or transceiver 122 that is transmitting in a same range as another antenna but in a different physical direction. This permits transmissions to and from a 360° circumference (and the corresponding volume) from the tower 120 or transceiver 122, while minimizing interference between the antennas. As in method 200, these factors are used to determine the theoretical data throughput levels of the transceiver 122. Then, using the network probe 112, as described above, to identify and analyze packets transmitted to and from the transceiver 304, the RQI is determined. To determine the RQI, measurements from one or both of the RAN 116 or the core network 104 are taken. Using this data, calculations to generate average and peak packet loss, average and peak latency for a user-session, average and peak packet loss for a user-session, average and peak throughput, average and peak throughput for a user-session, and average and peak CQI per sector per frequency are performed to generate information similar to that as illustrated in FIG. 2C. In some examples, the user-session specific data used in connection with FIG. 2C is aggregated according to a common transceiver 122 and used as the basis for the calculation of the foregoing parameters. Information analogous to that illustrated in FIG. 2C establishes the various thresholds by which the RQI is determined.

The RQI is determined based on consideration of at least one of the following performance metrics: average/peak latency by frequency and by sector, total users by frequency and by sector, average/peak packet loss by frequency and by sector, average throughput by frequency and by sector, average and peak CQI by frequency and by sector, average and peak TBS by frequency and sector, average and peak modulation by frequency and by sector.

Applications for this RQI determination include troubleshooting individual transceivers 122, monitoring high profile, high use, or critical transceivers (e.g., at a sports stadium, at a large event, or associated with a high value customer), managing or planning transmission capacity usage, frequency load balancing, and others.

Embodiments of the present disclosure are also applicable to measuring RQI for a plurality of user-sessions associated with a cluster 308 of transceivers 122. Analogous to the above methods, the frequencies of the transceivers 122 are determined, as are the number of antenna (i.e., SISO or MIMO) of each transceiver in the cluster 308. The results are used to determine per transceiver, for example, 1) the average latency per transceiver 122 of the cluster 308 by sector and frequency, 2) the average throughput per transceiver as a function of sector and frequency, 3) the average packet loss per transceiver as a function of sector and frequency 4) the average CQI per transceiver 122 by sector and frequency, and 5) the number of mobile communications devices by transceiver 122 per sector per frequency. The plurality of user-sessions can be based on combining user session data from users having one or more common characteristic, e.g., type of mobile device, geography, service provider, etc.

The foregoing factors are then used to determine a combined average. This combined average can be used to determine the following averages for the cluster for a plurality of user-sessions by sector and frequency: latency, throughput, packet loss, number of mobile computing devices connected to the cluster, average cluster CQI, and cluster modulation. This information is used as the basis for determining RQI using the actual performance measured at one or both of the RAN 116 or the core network 104, analogous to method presented above in FIG. 2C.

This embodiment of the method is used, for example, to validate that highly populated areas have proper RF coverage, that each frequency is operating efficiently in various clusters, that RF capacity by frequency is being managed for performance and forecasted accurately, that "hand-offs" (e.g., transitions between transceivers or clusters) is being handled efficiently, that antenna tilt is set properly for the population density per transceiver 122, that the transceivers are being used efficiently while minimizing idleness, and other performance measures.

The foregoing methods can be adapted to measure the performance at a regional 312 level as well. While not shown in FIG. 3, other RQI (e.g., national, all-network) at other network scales can also be determined using embodiments described herein.

Computing Machine Architecture

Figure 4:
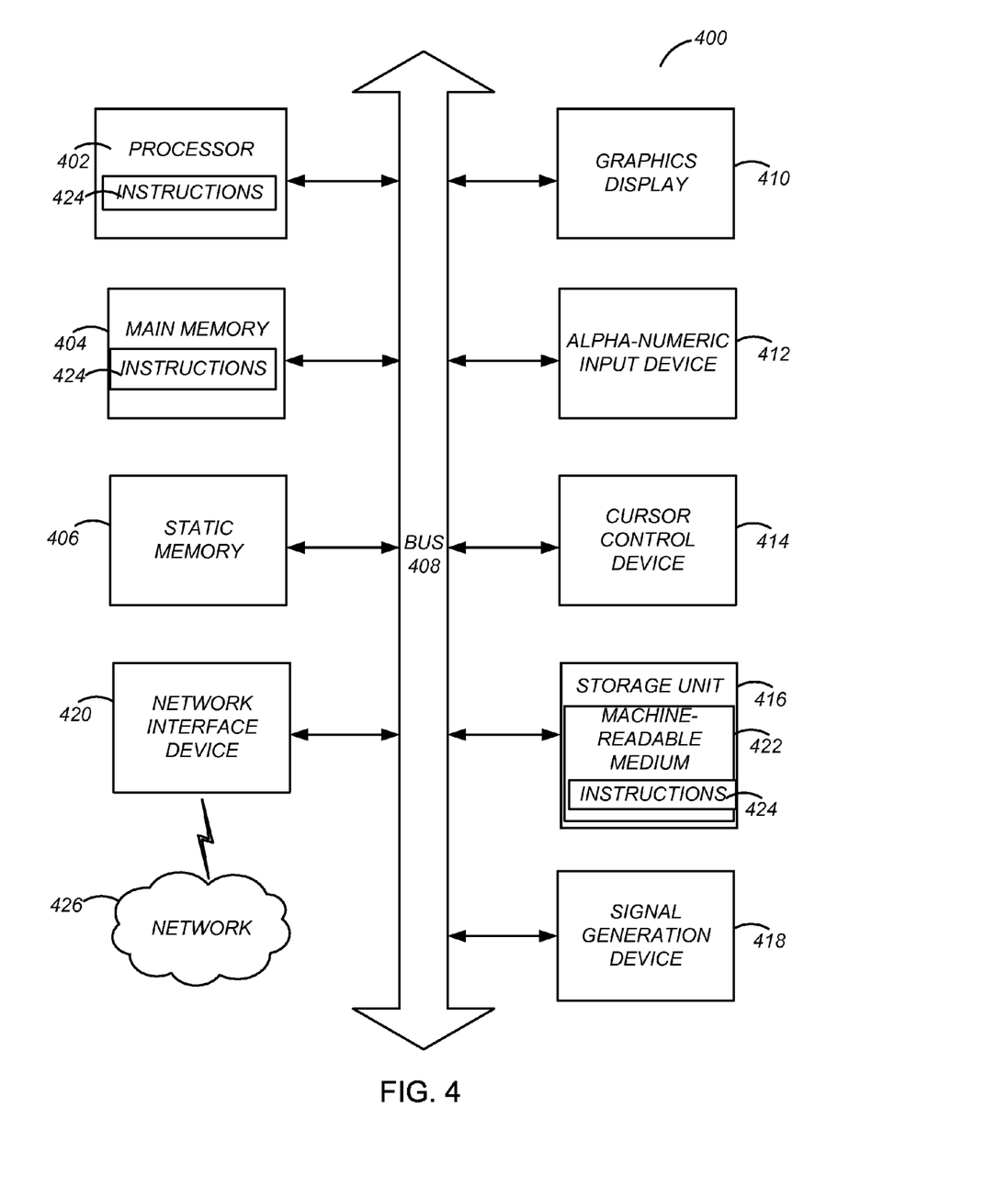
FIG. 4 is a block diagram illustrating components of an example machine able to read instructions from machine-readable medium and execute them in a processor (or controller), in an embodiment.

FIG. 4 is a block diagram illustrating components of an example machine able to read instructions from a machine-readable medium and execute those instructions in a processor to perform the machine processing tasks discussed herein, such as the engine operations discussed above. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a data store 416, a signal generation device 418 (e.g., a speaker), an audio input device 426 (e.g., a microphone) and a network interface device 420, which also are configured to communicate via the bus 408.

The data store 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network (not shown) via network interface 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 4. Alternatively, hardware or software modules may be stored elsewhere within a computing system.

As referenced herein, a computer or computing system includes hardware elements used for the operations described here regardless of specific reference in FIG. 4 to such elements, including for example one or more processors, high speed memory, hard disk storage and backup, network interfaces and protocols, input devices for data entry, and output devices for display, printing, or other presentations of data. Numerous variations from the system architecture specified herein are possible. The components of such systems and their respective functionalities can be combined or redistributed.

Additional Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the purposes described herein, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for measuring quality of a user-session of a communication network, the method comprising:
   determining at least one performance parameter associated with a radio access network (RAN) transceiver;
   determining a theoretical data throughput of the RAN transceiver using the at least one performance parameter;
   determining a set of channel quality indexes using the theoretical data throughput;
   determining a RAN quality index for the user-session by:
      determining, by at least one of the RAN or a core network, a network data throughput associated with the user-session; and
      selecting a value from the set of channel quality indexes corresponding to the data throughput of the user-session, the RAN quality index indicating a quality of the user-session.

2. The method of claim 1, wherein the performance parameters associated with the RAN transceiver comprises a radio frequency bandwidth.

3. The method of claim 1, wherein determining the network data throughput of the user-session comprises using a packet loss rate of the user-session.

4. The method of claim 1, wherein determining the network data throughput of the user-session comprises using a packet re-transmission rate of the user-session.

5. The method of claim 1, wherein determining the network data throughput of the user-session comprises using a latency metric of the user-session.

6. The method of claim 1, wherein determining the network data throughput of the user-session comprises using a transmitted block size.

7. The method of claim 1, wherein the RAN quality index for the user-session is determined contemporaneously with data transmissions of the user-session.

8. The method of claim 1, further comprising:
   determining a network data throughput associated with a plurality of user-sessions associated with a first network transceiver; and
   determining a number of users of the plurality per frequency per sector of the first network transceiver.

9. The method of claim 8, further comprising identifying a characteristic shared by the plurality of user-sessions.

10. The method of claim 9, wherein the characteristic comprises a type of a mobile computing device.

11. A method for measuring quality of a user-session of a communication network, the method comprising:
    determining at least one performance parameter associated with each transceiver of a plurality of radio access network (RAN) transceivers;
    determining an average performance metric by combining the at least one performance parameters of the RAN transceivers;
    determining an average theoretical data throughput for the plurality of RAN transceivers using the average performance metric;
    determining a set of channel quality indexes using the average theoretical data throughput for the plurality of RAN transceivers;
    determining a RAN quality index for the plurality of RAN transceivers by:
       determining, by at least one of the RAN or a core network, an average network data throughput for a plurality of user-sessions associated with the plurality of RAN transceivers; and
       selecting a value from the set of channel quality indexes corresponding to the average data throughput for the plurality of user-sessions associated with the plurality of RAN transceivers, the RAN quality index indicating a quality of the plurality of RAN transceivers.

12. The method of claim 11, further comprising selecting the plurality of user-sessions based on a characteristic shared by the user-sessions.

13. The method of claim 12, wherein the characteristic comprises a type of mobile computing device.

14. The method of claim 12, wherein the characteristic comprises a cluster of transceivers.

15. The method of claim 12, wherein the characteristic comprises a plurality of transceivers in a geographic region.

16. The method of claim 11, further comprising identifying a subset of user-sessions sharing the RAN quality index and a characteristic.

17. A computer program product for determining a quality of a user-session of a communication network, wherein the computer program product is stored on a non-transitory computer-readable medium that includes instructions that, when loaded into memory, cause a processor to perform a method, the method comprising:
    determining at least one performance parameter associated with each transceiver of a plurality of radio access network (RAN) transceivers;
    determining an average performance metric by combining the at least one performance parameters of the RAN transceivers;
    determining an average theoretical data throughput for the plurality of RAN transceivers using the average performance metric;

determining a set of channel quality indexes using the average theoretical data throughput for the plurality of RAN transceivers;
determining a RAN quality index for the plurality of RAN transceivers by:
    determining, by at least one of the RAN or a core network, an average network data throughput for a plurality of user-sessions associated with the plurality of RAN transceivers; and
selecting a value from the set of channel quality indexes corresponding to the average data throughput for the plurality of user-sessions associated with the plurality of RAN transceivers, the RAN quality index indicating a quality of the plurality of RAN transceivers.

18. The method of claim 17, further comprising selecting the plurality of user-sessions based on a characteristic shared by the user-sessions.

19. The method of claim 18 wherein the characteristic comprises a type of mobile computing device.

20. The method of claim 18, wherein the characteristic comprises a cluster of transceivers.

* * * * *